United States Patent
Baig et al.

(10) Patent No.: US 10,673,973 B2
(45) Date of Patent: Jun. 2, 2020

(54) MULTIPLE VENDOR SERVICES ORIENTED ARCHITECTURE (SOA) SERVICE REQUESTING PROXY

(71) Applicant: International Business Machines Corporation, Armonk, NY (US)

(72) Inventors: Mirza Baig, Grand Prairie, TX (US); Juan F. Vargas, Cary, NC (US); Brian J. Snitzer, Lancaster, PA (US); Jun Li Zhao, Beijing (CN); Yan Du, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/128,923

(22) Filed: Sep. 12, 2018

(65) Prior Publication Data

US 2020/0084288 A1    Mar. 12, 2020

(51) Int. Cl.
*H04L 12/00*    (2006.01)
*H04L 29/08*    (2006.01)

(52) U.S. Cl.
CPC ......... *H04L 67/2833* (2013.01); *H04L 67/16* (2013.01); *H04L 67/2838* (2013.01); *H04L 67/2866* (2013.01)

(58) Field of Classification Search
CPC ............ H04L 12/2409; H04L 12/2411; H04L 12/2412; H04L 12/2424; H04L 12/2439; H04L 12/66; H04L 29/06; H04L 29/08072; H04L 41/0213; H04L 41/0813; H04L 41/085; H04L 41/12; H04L 67/06; H04L 67/1029; H04L 67/125; H04L 67/2838

USPC ................. 709/223, 224, 225, 226
See application file for complete search history.

(56) References Cited

U.S. PATENT DOCUMENTS

| | | | | |
|---|---|---|---|---|
| 7,698,171 B2* | 4/2010 | Rampell | ................ | G06Q 30/08 705/26.3 |
| 8,140,367 B2* | 3/2012 | Bernardini | ................ | G06F 8/71 705/7.13 |
| 8,413,107 B2* | 4/2013 | Brininstool | ................ | G06F 8/20 709/203 |
| 8,452,881 B2* | 5/2013 | Boubez | ................ | H04L 63/08 709/222 |

(Continued)

FOREIGN PATENT DOCUMENTS

WO    2017021155 A1    2/2017

OTHER PUBLICATIONS

"Istio", Istio 0.7, Copyright © 2018 Istio Authors, This site was built on Apr. 23, 2018, <https://istio.io/>, 4 pages.

(Continued)

*Primary Examiner* — Frantz Coby
(74) *Attorney, Agent, or Firm* — Stephen R. Yoder; David B. Woycechowsky (57) ABSTRACT

A single service proxy for requesting services from multiple different service vendors with different communication protocols. In this way, a single communication protocol can be used by a service consuming entity to request various services, through the multiple vendor proxy, from various vendors, with the multiple vendor proxy converting the requests into the communication protocol (for example, syntax) appropriate for the vendor from whom the service is being requested on behalf of the service consuming entity.

16 Claims, 5 Drawing Sheets

(56) References Cited

U.S. PATENT DOCUMENTS

| | | | | |
|---|---|---|---|---|
| 8,755,372 | B2* | 6/2014 | Fried | G06Q 30/02 370/352 |
| 9,037,692 | B2 | 5/2015 | Ferris | |
| 9,038,056 | B1 | 5/2015 | Wong et al. | |
| 9,130,921 | B2* | 9/2015 | Boubez | H04L 63/08 |
| 9,342,367 | B2 | 5/2016 | Koneti | |
| 10,424,010 | B2* | 9/2019 | Rampell | G06Q 30/0207 |
| 2005/0132381 | A1* | 6/2005 | Fiammante | G06F 8/24 719/310 |
| 2008/0077506 | A1* | 3/2008 | Rampell | G06Q 20/12 705/26.1 |
| 2009/0292599 | A1* | 11/2009 | Rampell | G06Q 30/02 705/14.13 |
| 2010/0017783 | A1* | 1/2010 | Brininstool | G06F 8/20 717/101 |
| 2011/0110364 | A1* | 5/2011 | Fried | G06Q 30/02 370/352 |
| 2011/0295998 | A1 | 12/2011 | Ferris | |
| 2011/0296021 | A1 | 12/2011 | Dorai | |
| 2012/0124211 | A1 | 5/2012 | Kampas | |
| 2015/0332351 | A1 | 11/2015 | McBride | |
| 2016/0212012 | A1 | 7/2016 | Lee | |
| 2017/0134246 | A1 | 5/2017 | Amendjian | |

OTHER PUBLICATIONS

"Serverless computing", Wikipedia, This page was last edited on Apr. 26, 2018, at 15:35, 6 pages, <https://en.wikipedia.org/wiki/Serverless_computing>.

"Using HTTP proxy for services that require a network access", Internet Gatekeeper, © F-Secure 2018 (https://www.f-secure,com, 2 pages.

* cited by examiner

LOG OF INSTANTIATION OF BUSINESS PROCESS

1. RETRIEVING INPUT DATA... SUCCESSFULLY COMPLETED
2. PERFORMING SERVICE A... SUCCESSFULLY COMPLETED
3. ANALYZING DATA RETURNED BY SERVICE A... SUCCESSFULLY COMPLETED
4. PERFORMING SERVICE C... SENDING REQUEST TO THIRD PARTY PROXY NOW...

MULTIPLE VENDOR SERVICES ORIENTED ARCHITECTURE (SOA) SERVICE REQUESTING PROXY

BACKGROUND

The present invention relates generally to providing service oriented architecture computing services to consumers and more particularly to provision of such computing services from multiple vendors to a single service consumer entity.

Service oriented architecture computing services (herein sometimes referred to more simply as "services") are known. In the contexts of software architecture, service-orientation in computing and service-oriented software architecture, a service is a computing functionality (for example, a software functionality) or a set of computing functionalities. In common computing parlance, "service" also refers to the machine logic (for example, computer program code that provides the functionality(ies)—however, this document may sometimes refer to the machine logic that implements the functionality of a service as service code. For example, one example service is retrieval of specified information. Another example service is the execution of a set of operations. Typically, different clients reuse a given service in the context of many and various larger computing tasks. For example, a service that retrieves a record associated with a person's name from a large data base may be used in: (i) by a larger program that is used to authenticate the person's identity over a communication network; (ii) by a larger program used to implement a legal change to the person's name; and (iii) by a search engine. In this example, the same code to retrieve the individual's record does not have to be rewritten for all three programs.

Typically, usage of a given service by various clients (sometimes herein called "service consuming entities") is controlled by machine logic implemented policies. Typically, a service consuming entity is a set of computers belonging to a company. For example, a search engine company may own a large set of server computer devices that all use record-retrieving service mentioned in the previous paragraph.

Typically, a given client (that is, service consuming entity) is identified by a certain code. In many cases, a policy dictates the length of time that the given client may use (that is, access) a given service. The use of services typically requires data communications, storage of data, processing of data and the like. The mechanism to enable access by a client to the functionality of a service includes access of the service code and access to the service implementation hardware (that is, the computing hardware that provides the data communications associated with the service, the storage of data associated with the service, the hardware that stores data associated with use of the service, and the like). For example, access to a given service may be provided using a prescribed interface and may be exercised consistent with constraints and policies as specified by the service description.

Often several different services will be used in a larger business process. For example, if the business process is a customer order for goods, then constituent services may include: (i) "Create Order," (ii) "Fulfill Order," (iii) "Ship Order," (iv) "Invoice Order," and (v) "Cancel/Update Order."

A service-oriented architecture (SOA) is a style of software design where services are provided: (i) to the other components by application components, (ii) through a communication protocol, and (iii) over a network. Service-oriented architectures are typically independent of (that is, generic with respect to) vendors, products and technologies. In an SOA, a service is a discrete unit of functionality that can be accessed remotely and acted upon and updated independently, such as retrieving a credit card statement online. In an SOA, a service typically has four properties: (i) it logically represents a business activity with a specified outcome; (ii) it is self-contained; (iii) t is a black box for its consumers; and (iv) it may consist of other underlying services. Different services can be used in conjunction to provide the functionality of a large software application. Typically, service-oriented architecture is less about how to modularize an application, and more about how to compose an application by integrating distributed, separately-maintained and deployed software components. It is enabled by technologies and standards that make it easier for components to communicate and cooperate over a network, especially an IP (internet protocol) network.

Serverless computing is a cloud-computing execution model in which the cloud provider dynamically manages the allocation of machine resources. Pricing is typically based on the actual amount of resources consumed by an application, rather than on pre-purchased units of capacity. Serverless computing is a form of utility computing. Serverless computing still typically requires servers, hence the term "serverless" is a bit of a misnomer. The name "serverless computing" is used because the server management and capacity planning decisions are typically completely hidden from the developer or operator. When using a service, the consumer only depends on the proxy and sends requests to the proxy. Typically, in serverless computing, each vendor will have its own dedicated proxy, and communications with a given serverless proxy will be vendor specific in their form and format.

Serverless code can be used in conjunction with code deployed in traditional styles, such as microservices. Alternatively, applications can be written to be completely serverless and entirely avoid the use of provisioned servers.

The website called "Serverless Architectures" dated 22 May 2018 (and at the following URL address https://martinfowler.com/articles/serverless.html) states as follows: "Serverless architectures are application designs that incorporate third-party 'Backend as a Service' (BaaS) services and/or that include custom code run in managed, ephemeral containers on a 'Functions as a Service' (FaaS) platform."

Serverless architectures are known to move much behavior to the front end. When using a service, the consumer only depends on the proxy and sends requests to the proxy. "Serverless" architectures typically remove, or reduce, the need for the traditional "always on" server systems sitting behind an application. "Sitting behind" means underlying here, particularly the servers or other hardware to deploy or run an application.

The use of proxies in computing (herein sometimes referred to as "proxies" or "proxy servers") is known. A proxy server is used when a communication: (i) is sent from a source computing device over a communication network including a set of proxy computing device(s) and to a target computing device; (ii) the set of proxy computing device(s) do not reveal an identity of the target computing device (or user(s) associated therewith) to the source computing device; and (iii) the set proxy computing device(s) communicate the communication to the target computing device. Typically, the communication from the source to the target is responsive to a request from the target computing device to the source computing device, where: (i) the request also is communicated through the proxy; and (ii) the proxy prevents the source device from receiving an effective identification of the target.

In computer networks, a proxy server is a server (a computer system or an application) that typically acts as an intermediary for requests from clients seeking resources from other servers. Typically, a client connects to the proxy server, requesting some service, such as a file, connection, web page, or other resource available from a different server and the proxy server evaluates the request as a way to simplify and control its complexity. Proxies were invented to add structure and encapsulation to distributed systems. Today, most proxies are web proxies, facilitating access to content on the World Wide Web, providing anonymity and may be used to bypass IP address blocking. A proxy server may reside on the user's local computer, or at various points between the user's computer and destination servers on the Internet.

In some cases, a proxy can be right on the user's computer and not on an intermediate computer. Whether the proxy is in the user's computer, or in an intermediate computer, the IP address of the proxy is typically reachable in the user's LAN (local area network) (for example, 127.0.0.1 or localhost for the user's computer, and 9.181.91.249 for an intermediate computer).

SUMMARY

According to an aspect of the present invention, there is a method that performs the following operations (not necessarily in the following order: (i) receiving, by a service requestor proxy system (SRPS), a service/vendor mapping data store including information indicative of: (a) an identity of a first service-oriented architecture (SOA) service that is provided by a first vendor, and (b) an identity of a second (SOA) service that is provided by a second vendor; (ii) receiving a first SOA service request, from a first client device, over a communication network and by the SRPS, with the first service request being a request for performance of the first SOA service; (iii) determining, by the SRPS, that the first vendor performs the first SOA service based upon the service/vendor mapping data store; (iv) responsive to the determination that the first vendor performs the first SOA service, sending, by the SRPS, over the communication network and to a first vendor SOA performance system, a second SOA service request that requests performance of the first SOA service as a proxy on behalf of the first client device; (v) receiving a third SOA service request, from a second client device, over the communication network and by the SRPS, with the third SOA service request being a request for performance of the second SOA service; (vi) determining, by the SRPS, that the second vendor performs the second SOA service based upon the service/vendor mapping data store; and (vii) responsive to the determination that the second vendor performs the second SOA service, sending, by the SRPS, over the communication network and to a second vendor SOA performance system, a fourth SOA request that requests performance of the second SOA service as a proxy on behalf of the second client device.

According to this aspect of the present invention, the method additionally performs the following operations (not necessarily in the following order): (i) responsive to receipt of the second SOA service request, performing, by the first vendor SOA service performance system, the first SOA service on behalf of the first client device; and (ii) responsive to receipt of the fourth SOA service request, performing, by the second vendor SOA service performance system, the second SOA service on behalf of the second client device.

According to an aspect of the present invention, there is a method that performs the following operations (not necessarily in the following order): (i) receiving, by a service requestor proxy system (SRPS), a service/vendor mapping data store including information indicative of: (a) an identity of a first service-oriented architecture (SOA) service that is directly requested using a first communication protocol, and (b) an identity of a second (SOA) service that is provided by a second communication protocol; (ii) receiving a first SOA service request, from a first client device, over a communication network and by the SRPS, with the first SOA service request being formed and formatted according to a generic communication protocol, with the first service request being a request for performance of the first SOA service, and with the generic communication protocol being different from the first communication protocol; (iii) determining, by the SRPS, that the first SOA service is to be directly requested in the first communication protocol based upon the service/vendor mapping data store; (iv) converting, by the SRPS, the first SOA service request from the generic communication protocol to a second SOA service request for performance of the first SOA service, with the second SOA service being formed and formatted according to the first communication protocol; (v) sending, by the SRPS, over the communication network and to a first SOA performance system, the second SOA service request formed and formatted according to the first communication protocol; (vi) receiving a third SOA service request, from a second client device, over a communication network and by the SRPS, with the third SOA service request being formed and formatted according to the generic communication protocol, with the third SOA service request being a request for performance of the second SOA service, and with the generic communication protocol being different from the second communication protocol; (vii) determining, by the SRPS, that the third SOA service is to be directly requested in the second communication protocol based upon the service/vendor mapping data store; (viii) converting, by the SRPS, the third SOA service request from the generic communication protocol to a fourth SOA service request for performance of the second SOA service, with the fourth SOA service being formed and formatted according to the second communication protocol; and (ix) sending, by the SRPS, over the communication network and to a second SOA performance system, the fourth SOA service request formed and formatted according to the second communication protocol.

According to this aspect of the present invention, the method additionally performs the following operations (not necessarily in the following order): (i) responsive to receipt of the second SOA service request, performing, by the first vendor SOA service performance system, the first SOA service on behalf of the first client device; and (ii) responsive to receipt of the fourth SOA service request, performing, by the second vendor SOA service performance system, the second SOA service on behalf of the second client device.

According to an aspect of the present invention, there is a method that performs the following operations (not necessarily in the following order): (i) receiving, by a service requestor proxy system (SRPS), a service/vendor mapping data store including information indicative of: (a) an identity of a first service-oriented architecture (SOA) service that is directly requested from a first vendor using a first communication protocol, and (b) an identity of a second (SOA) service that is provided by a second vendor a second communication protocol; (ii) receiving a first SOA service request, from a first client device, over a communication network and by the SRPS, with the first SOA service request being formed and formatted according to a generic communication protocol, with the first service request being a request for performance of the first SOA service, and with the generic communication protocol being different from the first communication protocol; (iii) determining, by the SRPS, that the first SOA service is to be directly requested in the first communication protocol based upon the service/vendor mapping data store; (iv) determining, by the SRPS, that the first vendor performs the first SOA service based upon the service/vendor mapping data store; (v) converting, by the SRPS, the first SOA service request from the generic communication protocol to a second SOA service request for performance of the first SOA service, with the second SOA service being formed and formatted according to the first communication protocol; (vi) responsive to the determination that the first vendor performs the first SOA service, sending, by the SRPS, over the communication network and to a first SOA performance system, the second SOA service request formed and formatted according to the first communication protocol; (vii) receiving a third SOA service request, from a second client device, over a communication network and by the SRPS, with the third SOA service request being formed and formatted according to the generic communication protocol, with the third SOA service request being a request for performance of the second SOA service, and with the generic communication protocol being different from the second communication protocol; (viii) determining, by the SRPS, that the third SOA service is to be directly requested in the second communication protocol based upon the service/vendor mapping data store; (ix) converting, by the SRPS, the third SOA service request from the generic communication protocol to a fourth SOA service request for performance of the second SOA service, with the fourth SOA service being formed and formatted according to the second communication protocol; (x) determining, by the SRPS, that the second vendor performs the second SOA service based upon the service/vendor mapping data store; and (xi) responsive to the determination that the second vendor performs the second SOA service, sending, by the SRPS, over the communication network and to a second SOA performance system, the fourth SOA service request formed and formatted according to the second communication protocol.

According to this aspect of the present invention, the method additionally performs the following operations (not necessarily in the following order): (i) responsive to receipt of the second SOA service request, performing, by the first vendor SOA service performance system, the first SOA service on behalf of the first client device; and (ii) responsive to receipt of the fourth SOA service request, performing, by the second vendor SOA service performance system, the second SOA service on behalf of the second client device.

DETAILED DESCRIPTION

In some embodiments of the present invention, there is a single service proxy for requesting services from multiple different service vendors. In this way, a single communication protocol can be used by a service consuming entity to request various services, through the multiple vendor proxy, from various vendors, with the multiple vendor proxy converting the requests into the communication protocol (for example, syntax) appropriate for the vendor from whom the service is being requested on behalf of the service consuming entity. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
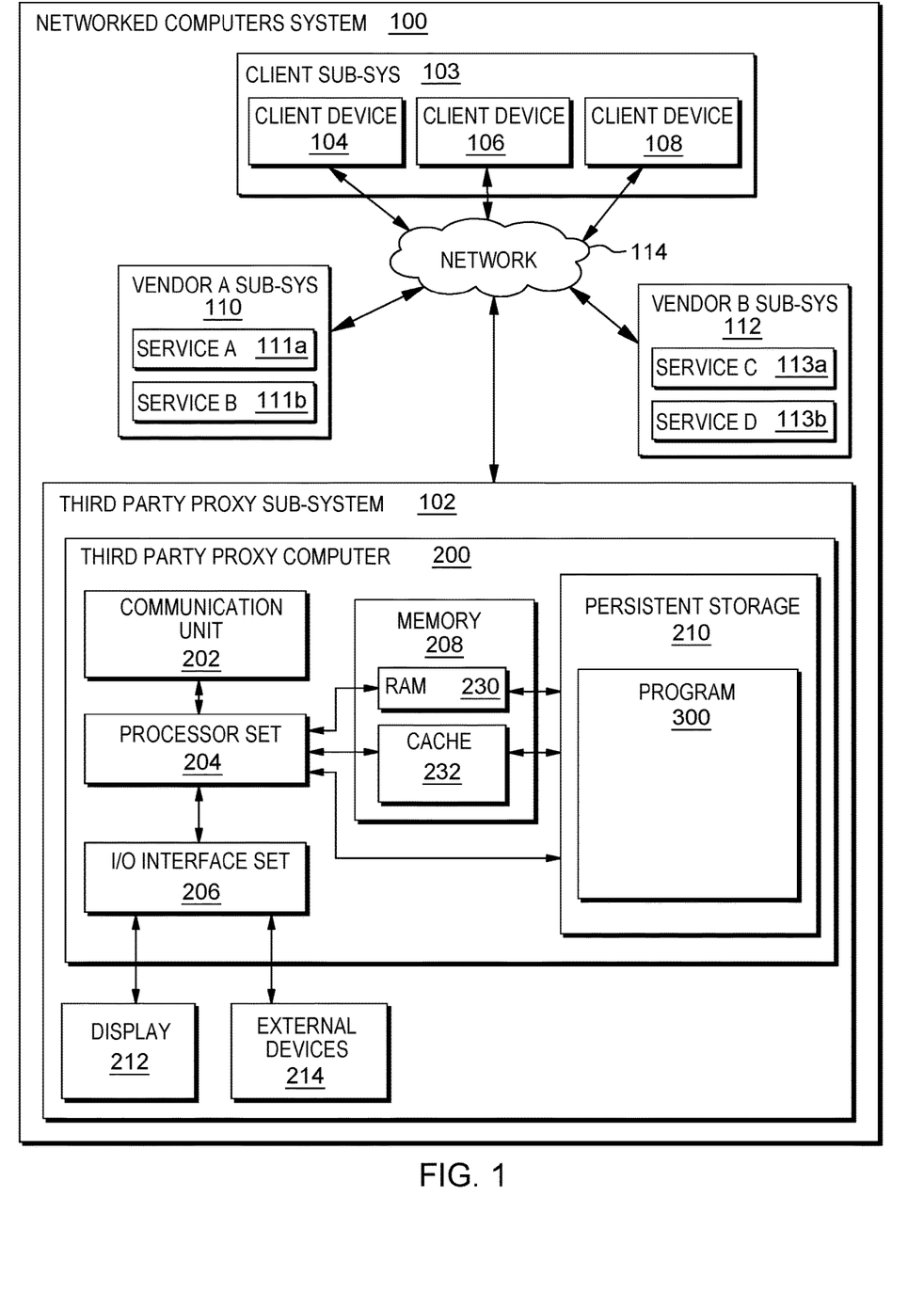
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: third party proxy sub-system 102 (sometimes also referred to a multiple vendor service request proxy or a multiple vendor proxy or, simply as sub-system 102); client sub-system 103 (sometimes also referred to as a service consumer entity sub-system); vendor A sub-system 110; vendor B sub-system 112; and communication network 114.

Third party proxy sub-system 102 includes: third party proxy computer 200; communication unit 202; processor set 204; input/output (I/O) interface set 206; memory device 208; persistent storage device 210; display device 212; external device set 214; random access memory (RAM) devices 230; cache memory device 232; and program 300. In this example, the third party proxy is run by a company that is separate and distinct from the client (that is, the service consuming entities) and vendors A and B (that is, the two service providing entities in this example). Alternatively, instead of a proxy run by a third party, the proxy could be part of the service consuming entity's computer sub-system, or the computer sub-system of one of the vendors.

Client sub-system 103 includes client device 104; client device 106; and client device 108. These devices are the various computers of the service consuming entity and these computers work together to perform business processes attendant to the business of the service consuming entity.

Vendor A sub-system 110 includes code and hardware for service A 111*a* and code and hardware for service B 111*b*. Vendor B sub-system 112 includes code and hardware for service C 113*a* and code and hardware for service D 113*b*. As will be discussed in more detail, these two vendors use different communication protocols (that is, form and format of communications) to have services requested, receive input data attendant to service requests and to send back results of performance of the service functionality.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
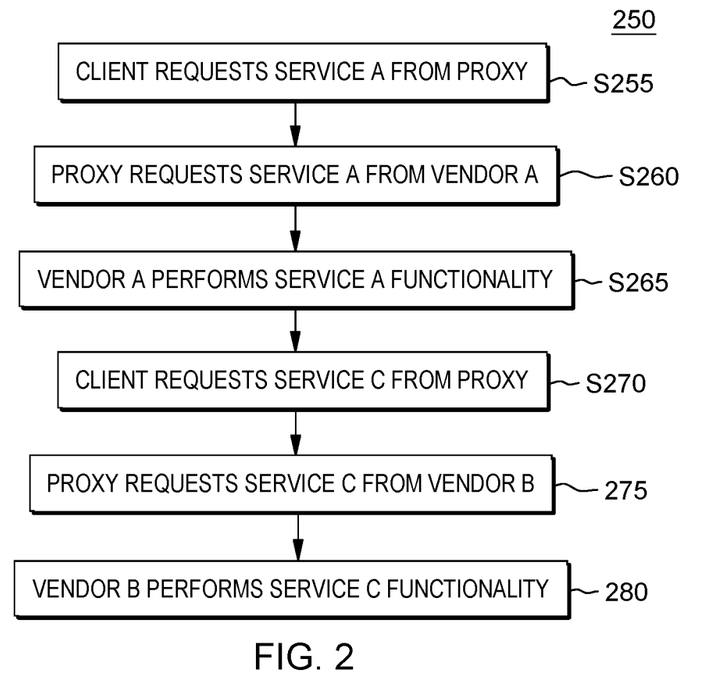
FIG. 2 is a flowchart showing a first embodiment method performed, at least in part, by the first embodiment system.
Figure 3:
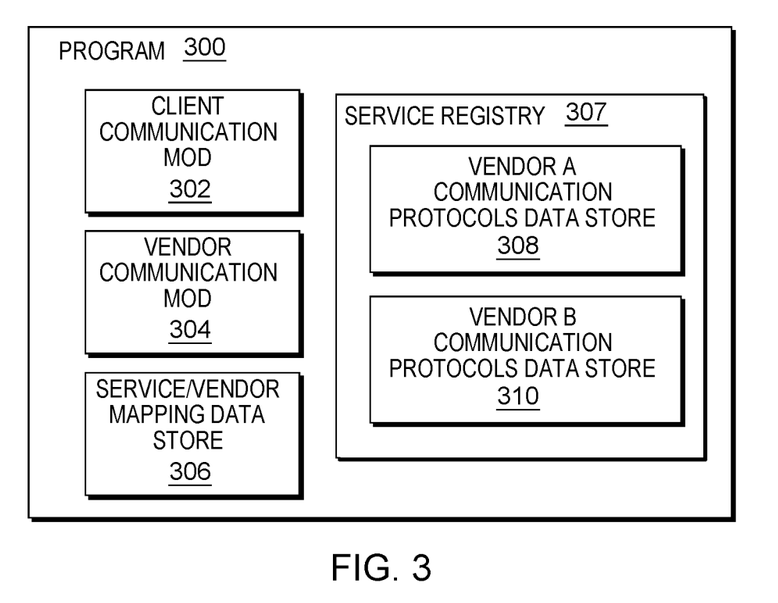
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where client device 104 of client sub-system 103 (see FIG. 1) sends a first request for an SOA service through communication network 114 to client communication module ("mod") 302 of program 300 of third party proxy computer 200 of third party proxy sub-system 102 (see FIG. 1). In this example, the first request is a request for an SOA service that obtains an insured party's last name for purposes of creating an insurance contract (the service consuming entity in this example is an insurance company). This functionality is provided by Vendor A (see FIG. 1 at reference numeral 110 and 111a). However, the request is not sent to Vendor A sub-system 110, but rather to third party proxy sub-system 102 for reasons that will become apparent as the discussion of flowchart 250 continues. It is noted that service A 111a provides the service of obtaining a last name for many different service consuming entities, not just client sub-system 103. In this example, it happens to be an insurance company that is using the service, but many other types of companies need to get last names of their customers, their employees, their subjects of targeted advertising and so on.

Now the communication protocol (that is, the form and format) of this first request for service A will now be discussed. This communication protocol for the first request is a protocol designed especially for receipt by third party proxy sub-system 102. In this example, one part of this protocol is that the request is made up of binary code that is ASCII code. Another part of this protocol is that all new service requests begin with ASCII code that starts with a $ character. After the $ character, the protocol for third party proxy 102 mandates that the name of the service be given (in this case, "Service A"). After the service name, the protocol for third party proxy 102 mandates that the needed input data of the service be given (in this case, the only input data needed is the maximum number of characters the last name can have). All of the client computers 104, 106 and 108 of the service consuming entity know this SOA request protocol and only this SOA service request protocol. This is because, in this example, all computers of the service consuming entity make all SOA services requests directly to the proxy.

Processing proceeds to operation 5260, where: (i) service/vendor mapping data store 306 is consulted to determine that requested Service A is provided by a vendor called Vendor A and located on the communication network at the location shown in FIG. 1; (ii) service registry 307 determines the SOA service request protocol for Vendor A and converts the first request in the proxy's protocol to a second equivalent request in the protocol promulgated by Vendor A (more specifically, the communications protocol promulgated by Vendor A is located in Vendor A communication protocols data store 308 of service registry 307); and (iii) vendor communication mod 304 sends the second request over communication network to Vendor A sub-system 110 (see FIG. 1).

More specifically, in the communication protocol used by the service provider Vendor A: (i) the initial character is # (this aspect of the communication protocol is part of what may be referred to as syntax); (ii) the input data field(s) (in this example, the maximum length of the last name) directly follow the leading # character (this is another part of the syntax aspect of communication protocol); (iii) the service name (in this example, "Service A") directly follows the input data fields (this is another part of the syntax aspect); and (iv) the service request is binary data in Unicode format (this is an alphanumeric-to-binary aspect of the communication protocol). Notice that these three items are different than the SOA service request protocols used by incoming requests to the proxy. Registry 307 converts the first request into the second request so that the service request can be understood and responded to by Vendor A sub-system 110. The service registry stays up to date on all the communication protocols of all the various vendors so that the service consumer does not have to. In this example there are only two vendors, Vendor A and Vendor B. Alternatively, real world systems may include many, many vendors that frequently change their protocols. The service registry keeps abreast of all this information, again, so that the various client machines of the service consuming entity do not have to.

Processing proceeds to operation 5265, where Service A hardware and software block 111a of Vendor A sub-system 110 performs the functionality of service A to obtain output data in the form of a last name of an insured party (in this example, the last name is "DOE"). This output data is communicated through proxy sub-system 102 back to client device 104 that initially requested the service. Alternatively, Vendor A sub-system 110 could send the last name character string directly to client device 104.

Processing proceeds to operation 5270, where client device 108 sends a third SOA service request, for Service C (provided by Vendor B) to proxy sub-system 102. This third request is in the communication protocol used by the proxy (that is, the one that starts new requests with a $ character) and not the communication protocol used by Vendor B (which starts new requests with a % character). In this example, Service C provides a digital watermark on an electronic document (in this example, Doe's insurance policy). The input data in the request is the insurance policy electronic document.

Figure 4:
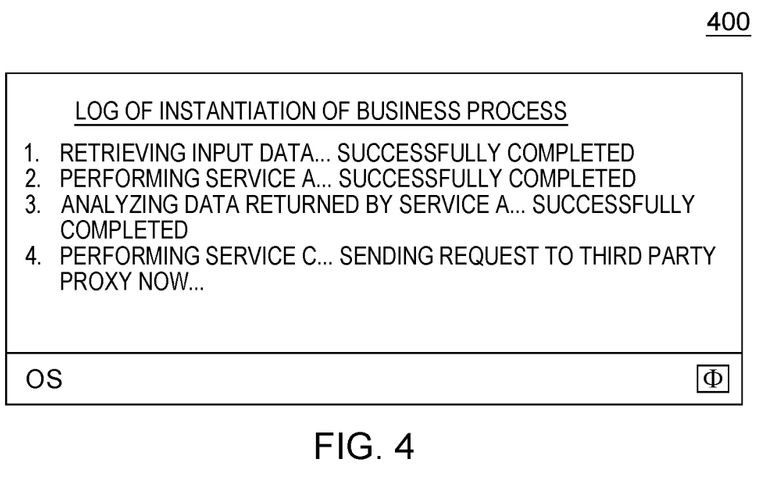
FIG. 4 is a screenshot view generated by the first embodiment system.

FIG. 4 shows screenshot 400, which is a display displayed to the user of client device 106 of the service consuming entity (in this example, an insurance company). More specifically, client device 106 is monitoring and reporting on the business process of getting Doe her insurance policy. As discussed above, part of this process uses Service A, and, now, at the time of operation 5270, Service C is being called into action as part of this larger business process. As shown by the text of screenshot 400, the use of Service A has been completed and the functionality of Service C (that is, the application of the watermark to Doe's policy) is pending at proxy 102 and/or vendor B sub-system 112.

Processing proceeds to operation 5275, where proxy 102 translates the third request into a fourth request, which uses the communication protocol of Vendor B, using service/vendor mapping data store 306 and Vendor B communication protocols data store 310. This third request is sent to Vendor B sub-system 112 by vendor communication mod 304.

Processing proceeds to operation 5280 where Service C applies the watermark to Doe's insurance policy and sends it back to client device 108 through proxy 102.

III. Further Comments and/or Embodiments

Some embodiments of the present invention recognize that currently conventional serverless type computing environments have major drawbacks like vendor lock-in and limitations of specific vendors.

Some embodiments of the present invention are directed to methods and systems for "serviceless computing," which may have advantages over other existing computing models. In "serviceless computing" the computing device that acts as a service consumer (that is, the "service consumer") is decoupled from the computing device that provides the service (that is, the service code and the service implementation hardware). The use of the word "decoupling" is meant in a very certain sense here. "Decoupling," as used herein, does not mean that the service consumer does not request the services and/or does not receive the functionality(ies) of the services that the service consumer wants and needs. Indeed, as in traditional SOAs the service consumer gets the computing benefit of the services that the service consumer requests (and may even pay for). Rather, decoupling means some, or all, of the following tasks associated with accessing services are performed by computer hardware that is located "between" the service consumer and the service code/service implementation hardware: (i) local proxying related tasks; (ii) service aggregation related tasks; (iii) service registry related tasks; and/or (iv) service routing related tasks. In some embodiments, a main reason for using a proxy is that the consumer only depends on the proxy and the proxy talks to the changing services. That way the consumer is decoupled from that actual services and providers.

Some embodiments of the present invention may have one, or more, of the following features, characteristics, operations and/or advantages: (i) services provided via local proxy and catalog; (ii) eliminates the lock-in and limitations from current cloud/serverless computing; (iii) enables consumer directed eco-system for much easier cloud adoption and migration; (iv) methods and components for providing serviceless computing with much less nursing of where/who/how the services (a new computing model); (v) method for decoupling service client from actual service deployment (using proxy on client instead of server); (vi) method for eliminating vendor lock-in and limitations; (vii) a way of providing cross-vendor scalability; (viii) method for customer to rank and choose best-of-breed services from various vendor; (ix) business model/eco-system for cloud computing; (x) local proxy is a transparent proxy; (xi) in the case of services aggregation (for example, aggregating service-1 from provider-1 and service-2 from provider-2 to service-3), using a non-transparent proxy as the local proxy; and/or (xii) local proxy located in Layer-7, application layer. Some embodiments of the present invention may have one, or more, of the following features, characteristics, operations and/or advantages: (i) a computing model where service consumers don't need to worry about who provides the service and how/where they implemented it; (ii) decouples (see explanation of this term, above) service client from actual service instances for a lot more flexibility and resilience; (iii) breaks the existing cloud service provider lock-in and limitations; and/or (iv) fosters a new eco-system where service consumer.

Some embodiments of the present invention may have one, or more, of the following features, characteristics, operations and/or advantages: (i) serviceless computing with more accurate, implicit services; (ii) flexible and cost-effective, because service consumers don't need to worry about servers, services or vendors; (iii) moves the cloud computing paradigm a more data centric and customer centric computing model to unleash the flexibility and resilience from client side; (iv) using a local proxy as a key for enabling serviceless computing; (v) proxy is used on the client side (instead of the server side) to decouple service consumer from where/who/how the services are implemented and run; and/or (vi) a business model for cloud though serviceless computing where the customer can choose or switch to any vendors who follow the same service specification but provide better quality.

Figure 5:
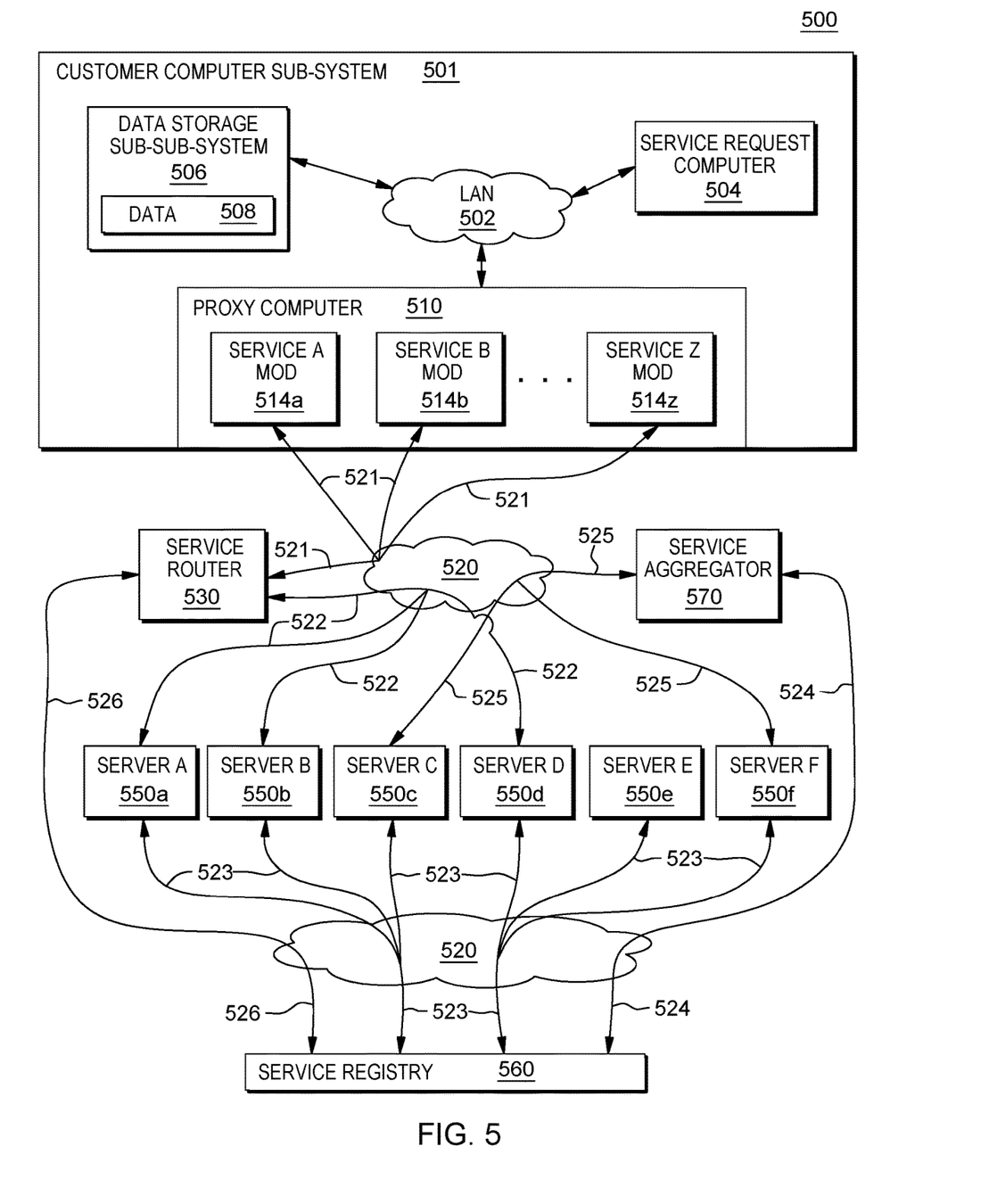
FIG. 5 is a block diagram view of a second embodiment of a system according to the present invention.

FIG. 5 shows SOA computer system 500 including: customer computer sub-system 501; cloud communication network hardware 520 (note that cloud communication network hardware 520 is shown in two parts to minimize crossing of depicted communication paths); service router 530; service aggregator 570; server A to server F 550a to 550f; service registry 560; proxy/router communication paths 521; router/server communication paths 522; registry/server communication paths 523; aggregator/registry communication paths 524; aggregator/server communication path 525; router/registry communication path 526. Customer computer sub-system 501: data storage sub-sub-system 506 (including data 508); local area network 502; service request computer 504; and proxy computer 510. Proxy computer 510 includes service A to service Z modules ("mods") 514a to 514z.

In system 500: (i) Vendor A owns and controls server F 550f; (ii) Vendor B owns and controls servers C, D and E 550c to 550e; and (iii) Vendor C controls servers A and B 550a and 550b.

The information stored in service registry 560 includes, local service id, url, port, version, and remote service id, url, port, version, vendor. For example, the consumer is using a service "/service-1.2" from provider-a via a local proxy. When the consumer sends a request to the local proxy, the proxy will look up the remote service id, url, port, version, vendor and other info from Service Registry and forward the request to the remote provider. When this service is upgraded or the provide changes, service registry 560 is updated accordingly. There could be multiple computer nodes from the consumer's LAN need to look up remote service info from service registry 560, so it's better to keep service registry 560 on a separate node (shared service registry). For currently conventional serverless computing: (i) there is typically no proxy and the consumer is typically coupled with a fixed external service address/provider; and (ii) when a request comes in, that specific provider provision server typically handles the request "behind the scene."

In some embodiments, service aggregator 570 stores and maintains aggregated service information. In some embodiments, service aggregator 570 is an optional component of the overall system, and is typically used when a given set of consumers wants to combine service-related information from multiple services to meet a given goal of the given set of consumers. For example, in the case of food delivery-type services, a food delivery company would have an internal application that is used to plan and execute efficient routes of delivery so that when the food is delivered, it is delivered in a manner that complies with the food delivery contract the company may have with their various vendors. In this example, in order to efficiently plan and execute the food delivery services, the food delivery company: (i) aggregates weather-related information from a weather information service provider, and (ii) traffic-related information from a traffic information service provider. Here, in this example, the aggregated service information (which includes both the weather-related information and the traffic-related information) is stored and maintained in service aggregator 570. In some embodiments, service aggregator 570 is a shared component in a computing system for multiple internal applications, and as a result, in such cases, it is computationally more efficient to include service aggregator 570 on a separate computing machine.

In some embodiments, service router 530 stores and maintains information related to network dispatching requests to target service providers over wide area network (WAN).

Proxy computer 510 is a standard proxy (see definition of "proxy" in the Background, above). In some embodiments, consumers of a given service depend on proxy computer 510, and consequently sends service-related requests to proxy 510. In this embodiment, proxy computer 510 searches service registry 560 and dispatches the service-related requests to remote providers via service router 530. In some embodiments, proxy computer 510 can be on the same computer as service request computer 504 or proxy computer 510 can be on a separate machine altogether.

Service A mod (514a) includes any type of computing-related service that satisfies a consumer's business requirements. For example, service A includes at least the following services: (i) requesting a payment from a customer, (ii) reserving a hotel room, (iii) receiving a stock quote that is current as of the time of its initial request, (iv) video streaming, and/or (v) team collaboration.

Service B mod (514b) includes any type of computing-related service that satisfies a consumer's business requirements. For example, service B includes at least the following services: (i) requesting a payment from a customer, (ii) reserving a hotel room, (iii) receiving a stock quote that is current as of the time of its initial request, (iv) video streaming, and/or (v) team collaboration.

Service Z mod (514z) includes any type of computing-related service that satisfies a consumer's business requirements. For example, service Z includes at least the following services: (i) requesting a payment from a customer, (ii) reserving a hotel room, (iii) receiving a stock quote that is current as of the time of its initial request, (iv) video streaming, and/or (v) team collaboration.

Figure 6:
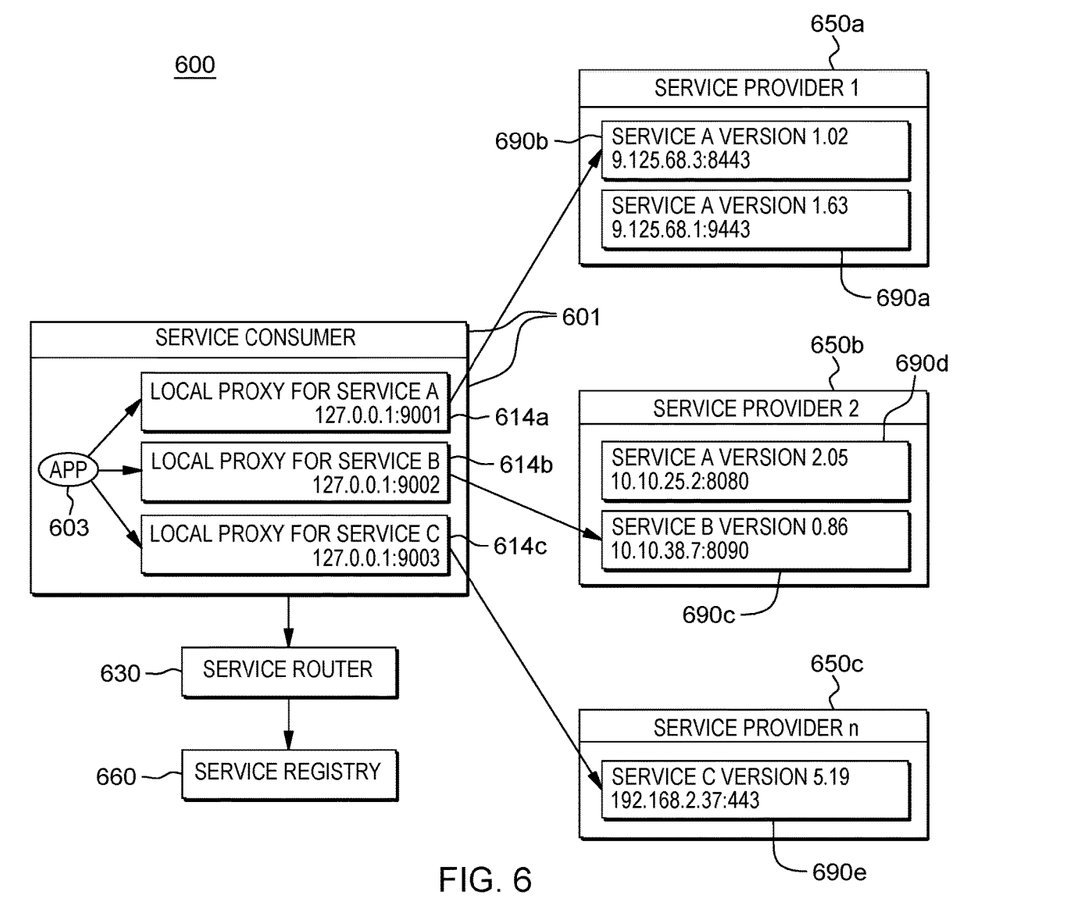
FIG. 6 is a block diagram view of a third embodiment of a system according to the present invention.

FIG. 6 shows SOA computer system 600 including: service consumer computer sub-system 601; service router 630; service provider 1 server 650a (including service code for services 690a, 690b); service provider 2 server 650b (including service code for services 690c, 690d); and service provider n server 650c (including service code 690e). Service consumer computer sub-system 601 includes app 603 and local proxies 614a to 614c. It is important to note that SOA computer system 600 does not include a service aggregator component (such as service aggregator 570 in FIG. 5). This is because, in SOA computer system 600, service aggregators are not mandatory. More specifically, service aggregators are needed only when a given consumer needs to mesh up (or combine) multiple external services, which is not the case here in SOA computer system 600.

App 603 includes any internal applications in the consumer's network that are using external services through local proxies (such as any of: (i) local proxy for Service A 614a, (ii) local proxy for Service B 614b, and/or (iii) local proxy for Service C 614c).

The detailed implementation of local proxy is shown by SOA computer system 600. Application 603 on the customer side only depends on local proxy services 614a, b and c. The requests are eventually routed to the actual services 690a, b, c, d, and e provided by service providers 650a, 650b, 650c via local proxies 614a, 614b and 614c, service router 630 and service registry 660. The service consumer has no idea where the services are, who provides them, which versions are used, what ports are connected, etc. In some embodiments, information related to where the services are, who provides them, which versions are used, and what ports are connected are stored in service registry 660. This information is not stored at the local proxies 614a, 614b and/or 614c because these proxies: (i) are used to dispatch service-related requests, (ii) receive responses related to those same requests, and (iii) searches service registry 660 to determine where to send the service-related requests. Other types of information stored in service registry 660 include: (i) service specifications (such as name, parameters, signature, version), (ii) service access (such as IP (internet protocol) address, port identification number, protocol used), and/or (iii) service vendor used (used currently, previously, or in the future). This information is stored in service registry 660 because all of the service-related details are "decoupled" from the customer with this type of "Serviceless Computing." As a consequence of this "decoupling," customers are able to achieve much more flexibility and agility in requesting and receiving the services required to fulfill their business objectives.

Additionally, Serviceless Computing enables the cross vendor scalability and resilience, which is not possible with any existing computing paradigms. Also, the relationship between service consumer and provider shifts to an ecosystem where the cloud adoption is much easier and efficient. For example, in one embodiment, there are two branches of the Service Consumer entity: (i) one branch in North America; and (ii) one branch in Europe. The requests to use a given service can be processed by two different Service Providers so that service requests from the North American branch are handled by a North American service provider and service requests from the European branch are handled by the European service provider. When the Service Consumer entity needs to use a new service, "New Service" it can just publish its service specification for the New Service. In response various service providers can provide the New Service by creating new services that meet the specification or by adding adapters to pre-existing services as appropriate. Then the Service Consumer can select among and between the various service providers that have found ways to provide the New Service. That way, the Service Consumer entity can achieve cross vendor load balancing, and also eliminate the vendor lock-in.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The invention claimed is:
1. A method comprising:
  receiving, by a service requestor proxy system (SRPS), a service/vendor mapping data store including information indicative of: (i) an identity of a first service-oriented architecture (SOA) service that is provided by a first vendor, and (ii) an identity of a second (SOA) service that is provided by a second vendor;

receiving a first SOA service request, from a first client device, over a communication network and by the SRPS, with the first service request being a request for performance of the first SOA service;

determining, by the SRPS, that the first vendor performs the first SOA service based upon the service/vendor mapping data store;

responsive to the determination that the first vendor performs the first SOA service, sending, by the SRPS, over the communication network and to a first vendor SOA performance system, a second SOA service request that requests performance of the first SOA service as a proxy on behalf of the first client device;

receiving a third SOA service request, from a second client device, over the communication network and by the SRPS, with the third SOA service request being a request for performance of the second SOA service;

determining, by the SRPS, that the second vendor performs the second SOA service based upon the service/vendor mapping data store; and responsive to the determination that the second vendor performs the second SOA service, sending, by the SRPS, over the communication network and to a second vendor SOA performance system, a fourth SOA request that requests performance of the second SOA service as a proxy on behalf of the second client device.

2. The method of claim 1 wherein:
the first client device is controlled by a first enterprise entity;
the second client device is controlled by the first enterprise entity;
the SRPS is controlled by a second enterprise entity;
the first vendor SOA performance system is controlled by a third enterprise entity; and
the second vendor SOA performance system is controlled by a fourth enterprise entity.

3. The method of claim 1 wherein:
the first client device is controlled by a first enterprise entity;
the second client device is controlled by the first enterprise entity;
the SRPS is controlled by the first enterprise entity;
the first vendor SOA performance system is controlled by a second enterprise entity; and
the second vendor SOA performance system is controlled by a third enterprise entity.

4. The method of claim 1 wherein:
the first client device is controlled by a first enterprise entity;
the second client device is controlled by a second enterprise entity;
the SRPS is controlled by a third enterprise entity;
the first vendor SOA performance system is controlled by a fourth enterprise entity; and
the second vendor SOA performance system is controlled by a fifth enterprise entity.

5. The method of claim 1 further comprising:
responsive to receipt of the second SOA service request, performing, by the first vendor SOA service performance system, the first SOA service on behalf of the first client device; and
responsive to receipt of the fourth SOA service request, performing, by the second vendor SOA service performance system, the second SOA service on behalf of the second client device.

6. The method of claim 5 wherein:
the performance of the first SOA service is carried out in a serviceless manner; and
the performance of the second SOA service is carried out in a serviceless manner.

7. A method comprising:
receiving, by a service requestor proxy system (SRPS), a service/vendor mapping data store including information indicative of: (i) an identity of a first service-oriented architecture (SOA) service that is directly requested using a first communication protocol, and (ii) an identity of a second (SOA) service that is provided by a second communication protocol;

receiving a first SOA service request, from a first client device, over a communication network and by the SRPS, with the first SOA service request being formed and formatted according to a generic communication protocol, with the first service request being a request for performance of the first SOA service, and with the generic communication protocol being different from the first communication protocol;

determining, by the SRPS, that the first SOA service is to be directly requested in the first communication protocol based upon the service/vendor mapping data store;

converting, by the SRPS, the first SOA service request from the generic communication protocol to a second SOA service request for performance of the first SOA service, with the second SOA service being formed and formatted according to the first communication protocol;

sending, by the SRPS, over the communication network and to a first SOA performance system, the second SOA service request formed and formatted according to the first communication protocol;

receiving a third SOA service request, from a second client device, over a communication network and by the SRPS, with the third SOA service request being formed and formatted according to the generic communication protocol, with the third SOA service request being a request for performance of the second SOA service, and with the generic communication protocol being different from the second communication protocol;

determining, by the SRPS, that the third SOA service is to be directly requested in the second communication protocol based upon the service/vendor mapping data store;

converting, by the SRPS, the third SOA service request from the generic communication protocol to a fourth SOA service request for performance of the second SOA service, with the fourth SOA service being formed and formatted according to the second communication protocol; and sending, by the SRPS, over the communication network and to a second SOA performance system, the fourth SOA service request formed and formatted according to the second communication protocol.

8. The method of claim 7 wherein the second SOA performance system is the same as the first SOA performance system.

9. The method of claim 7 wherein the second SOA performance system is different than the first SOA performance system.

10. The method of claim 7 wherein the second client device is the same as the first client device.

11. The method of claim 7 wherein the second client device is different than the first client device.

12. The method of claim 7 further comprising:

responsive to receipt of the second SOA service request, performing, by the first vendor SOA service performance system, the first SOA service on behalf of the first client device; and responsive to receipt of the fourth SOA service request, performing, by the second vendor SOA service performance system, the second SOA service on behalf of the second client device.

13. The method of claim 12 wherein:

the performance of the first SOA service is carried out in a serviceless manner; and the performance of the second SOA service is carried out in a serviceless manner.

14. A method comprising:

receiving, by a service requestor proxy system (SRPS), a service/vendor mapping data store including information indicative of: (i) an identity of a first service-oriented architecture (SOA) service that is directly requested from a first vendor using a first communication protocol, and (ii) an identity of a second (SOA) service that is provided by a second vendor a second communication protocol;

receiving a first SOA service request, from a first client device, over a communication network and by the SRPS, with the first SOA service request being formed and formatted according to a generic communication protocol, with the first service request being a request for performance of the first SOA service, and with the generic communication protocol being different from the first communication protocol;

determining, by the SRPS, that the first SOA service is to be directly requested in the first communication protocol based upon the service/vendor mapping data store;

determining, by the SRPS, that the first vendor performs the first SOA service based upon the service/vendor mapping data store;

converting, by the SRPS, the first SOA service request from the generic communication protocol to a second SOA service request for performance of the first SOA service, with the second SOA service being formed and formatted according to the first communication protocol;

responsive to the determination that the first vendor performs the first SOA service, sending, by the SRPS, over the communication network and to a first SOA performance system, the second SOA service request formed and formatted according to the first communication protocol;

receiving a third SOA service request, from a second client device, over a communication network and by the SRPS, with the third SOA service request being formed and formatted according to the generic communication protocol, with the third SOA service request being a request for performance of the second SOA service, and with the generic communication protocol being different from the second communication protocol;

determining, by the SRPS, that the third SOA service is to be directly requested in the second communication protocol based upon the service/vendor mapping data store;

converting, by the SRPS, the third SOA service request from the generic communication protocol to a fourth SOA service request for performance of the second SOA service, with the fourth SOA service being formed and formatted according to the second communication protocol;

determining, by the SRPS, that the second vendor performs the second SOA service based upon the service/vendor mapping data store; and responsive to the determination that the second vendor performs the second SOA service, sending, by the SRPS, over the communication network and to a second SOA performance system, the fourth SOA service request formed and formatted according to the second communication protocol.

15. The method of claim 14 further comprising:

responsive to receipt of the second SOA service request, performing, by the first vendor SOA service performance system, the first SOA service on behalf of the first client device; and responsive to receipt of the fourth SOA service request, performing, by the second vendor SOA service performance system, the second SOA service on behalf of the second client device.

16. The method of claim 15 wherein:

the performance of the first SOA service is carried out in a serviceless manner; and the performance of the second SOA service is carried out in a serviceless manner.

* * * * *